United States Patent
Xu (10) Patent No.: US 10,511,704 B2
(45) Date of Patent: Dec. 17, 2019

(54) METHOD AND DEVICE FOR DISPLAYING VIDEO INFORMATION, AND MOBILE TERMINAL

(71) Applicant: BEIJING KINGSOFT INTERNET SECURITY SOFTWARE CO., LTD., Beijing (CN)

(72) Inventor: Jialin Xu, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/381,741

(22) Filed: Apr. 11, 2019

(65) Prior Publication Data

US 2019/0289123 A1    Sep. 19, 2019

Related U.S. Application Data

(63) Continuation of application No. PCT/CN2017/106914, filed on Oct. 19, 2017.

(30) Foreign Application Priority Data

Mar. 31, 2017   (CN) .......................... 2017 1 0210162

(51) Int. Cl.
*H04M 1/725* (2006.01)
*G06F 3/0482* (2013.01)
(Continued)

(52) U.S. Cl.
CPC ...... *H04M 1/72555* (2013.01); *G06F 3/0482* (2013.01); *G06F 9/451* (2018.02); *H04M 1/72597* (2013.01); *G06F 3/04845* (2013.01)

(58) Field of Classification Search
CPC .... G06F 3/0653; G06F 3/0659; G06F 3/0683; H04W 4/12; H04W 4/18; H04W 60/00;
(Continued)

(56) References Cited

U.S. PATENT DOCUMENTS

2018/0077096 A1* 3/2018 DeMattei ................ H04L 51/10
2019/0124021 A1* 4/2019 DeMattei ................ H04L 51/04

FOREIGN PATENT DOCUMENTS

CN    103647803 A    3/2014
CN    103702218 A    4/2014
(Continued)

OTHER PUBLICATIONS

International Search Report issued in corresponding International Application No. PCT/CN2017/106914 dated Jan. 12, 2018 (2 pages).
(Continued)

*Primary Examiner* — Diane D Mizrahi
(74) *Attorney, Agent, or Firm* — Osha Liang LLP (57) ABSTRACT

The present disclosure provides a method and a device for displaying video information, and a mobile terminal. When the mobile terminal is in a screen locked state, the subscribed video message in a notification bar of the mobile terminal is parsed to acquire content information of the subscribed video message. In a card display mode, the content information is integrated to generate a target video card, and the target video card is displayed on a screen locked interface of the mobile terminal.

20 Claims, 9 Drawing Sheets

(51) Int. Cl.
*G06F 9/451* (2018.01)
*G06F 3/0484* (2013.01)

(58) Field of Classification Search
CPC ........... H04W 8/18; H04W 4/90; H04W 4/08; H04W 4/70
See application file for complete search history.

(56) References Cited

FOREIGN PATENT DOCUMENTS

| | | |
|---|---|---|
| CN | 105635442 A | 6/2016 |
| CN | 106210782 A | 12/2016 |
| CN | 107015806 A | 8/2017 |

OTHER PUBLICATIONS

Office Action issued in corresponding Chinese Application No. 201710210162.1 dated Mar. 11, 2019, and English translation thereof (23 pages).

* cited by examiner

METHOD AND DEVICE FOR DISPLAYING VIDEO INFORMATION, AND MOBILE TERMINAL

CROSS-REFERENCE TO RELATED APPLICATION

This application is a U.S. continuation application of International Application No. PCT/CN2017/106914, which claims priority to and benefits of Chinese Patent Application Serial No. 201710210162.1, entitled as "VIDEO INFORMATION DISPLAY METHOD AND APPARATUS, AND MOBILE TERMINAL", and filed on Mar. 31, 2017 by BEIJING KINGSOFT INTERNET SECURITY SOFTWARE CO., LTD.

TECHNICAL FIELD

The present disclosure relates to the field of information processing technologies, and more particular, to a method and a device for displaying video information, and a mobile terminal.

BACKGROUND

With the rapid development of mobile terminal manufacturing and the Internet, mobile terminals have become indispensable communication and entertainment means in people's lives. Some mobile terminals may have a screen lock function. In use process, the user can power off the screen of the mobile terminal by clicking a power button, or if the user does not operate the mobile terminal for a period of time, the screen of the mobile terminal will be automatically powered off. By the above manner, the power consumption of the mobile terminal can be reduced. Then, when the user clicks the power button again, the screen can be waked up and the screen locked interface can be displayed.

In the related art, when the mobile terminal is in a screen locked state, when there is a push message for video information in a notification bar, the video information is usually displayed in a message form in the screen locked interface. However, this display mode can only allow the user to know that there is a push message currently, and cannot allow the user to intuitively see the detailed content of the push message, the user experience is poor.

SUMMARY

Embodiments of the present disclosure provide a method for displaying video information. The method includes: when a mobile terminal is in a screen locked state, parsing a subscribed video message in a notification bar of the mobile terminal, to acquire content information of the subscribed video message; integrating, in a card display mode, the content information to generate a target video card; and displaying the target video card on a screen locked interface of the mobile terminal.

Embodiments of the present disclosure provide a storage medium. The storage medium is configured to store an application program. The application program is configured to perform the method for displaying video information according to the present disclosure when executed.

Embodiments of the present disclosure provide an application program. The application program is configured to perform the method for displaying video information according to the present disclosure when executed.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which:

FIG. 2($a$) is a schematic diagram illustrating a target video card being displayed on a screen locked interface according to an embodiment of the present disclosure;

FIG. 2($b$) is a schematic diagram illustrating a detail page of a target video card according to an embodiment of the present disclosure;

DETAILED DESCRIPTION

Embodiments of the present disclosure will be described in detail and examples of which are illustrated in the drawings, in which the same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

A method and a device for displaying video information, and a mobile terminal according to embodiments of the present disclosure are described below with reference to the accompanying drawings.

Figure 1:
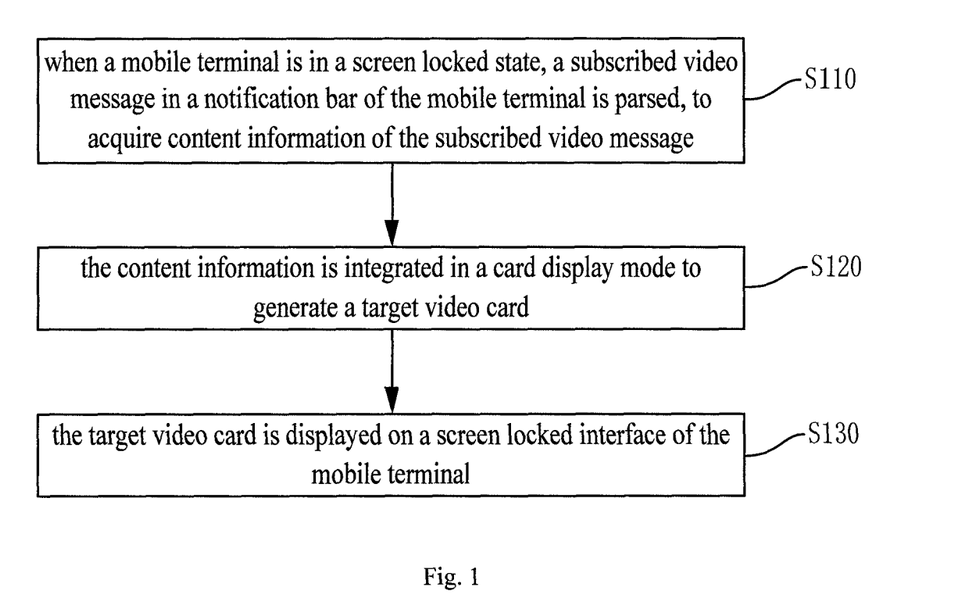
FIG. 1 is a flow chart of a method for displaying video information according to an embodiment of the present disclosure.

FIG. 1 is a flow chart of a method for displaying video information according to an embodiment of the present disclosure. It should be noted that, the method for displaying video information according to embodiments of the present disclosure may be applied to the device for displaying video information according to embodiments of the present disclosure, and the device may be configured in the mobile terminal. The mobile terminal may be a hardware device having various operating systems such as a mobile phone, a tablet computer, a personal digital assistant, and the like.

As illustrated in FIG. 1, the method for displaying video information may include the followings.

At block S110, when a mobile terminal is in a screen locked state, a subscribed video message in a notification bar of the mobile terminal is parsed, to acquire content information of the subscribed video message.

It should be noted that, the scenario in which the method for displaying video information according to embodiments of the present disclosure is applicable may be that the mobile terminal is in the screen locked state. When the mobile terminal is in the screen locked state, the notification bar can be monitored. When it is monitored that there is a notification message in the notification bar, it is determined whether the notification message includes a subscribed video message, when the notification message includes the subscribed video message, the subscribed video message is parsed to acquire the content information of the subscribed video message. The subscribed video can be understood as a video pre-subscribed by the user. For example, when the user wants to subscribe to a certain type of video, the video pushing system can send the subscribed video to the user's mobile terminal.

In an example, the content information may include a title, a video thumbnail, and video description information. In the embodiment, parsing the subscribed video message in the notification bar of the mobile terminal to acquire the content information of the subscribed video message may include: parsing the subscribed video message to acquire the title and video address information of the subscribed video message, acquiring the video description information of the subscribed video message based on the video address information, and generating the video thumbnail of the subscribed video message based on the video address information.

Specifically, the subscribed video message may be parsed to parse the video title and video URL (Uniform Resource Locator) address information in the subscribed video message. Then, the video description information of the subscribed video message may be acquired based on the video URL address information, and the subscribed video can be loaded based on the video URL address information, and a first frame video of the subscribed video can be taken as the video thumbnail.

At block S120, the content information is integrated in a card display mode to generate a target video card.

Figure 2A:
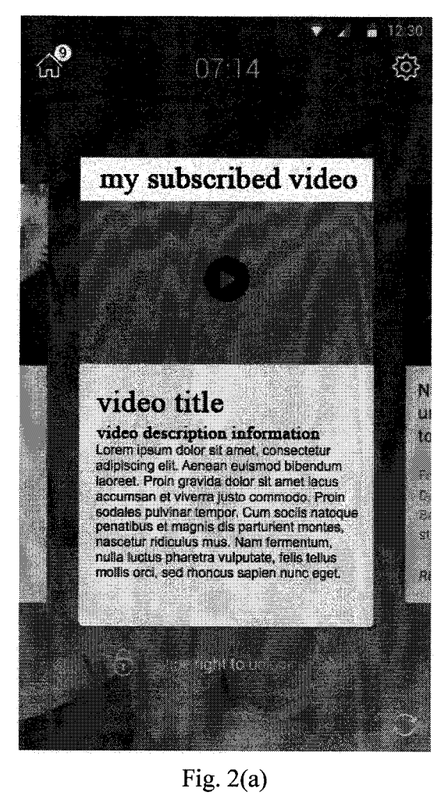

In other words, the content information (such as the video title, the video thumbnail and the video description information) of the subscribed video message is integrated into a message card to generate the target video card. For example, as illustrated in FIG. 2(a), the title, the video thumbnail and the video description information of the subscribed video are integrated into the target video card, in which, the content layout of the target video card may be the video thumbnail, the title and the video description information from top to bottom.

At block S130, the target video card is displayed on a screen locked interface of the mobile terminal.

Specifically, the target video card may be displayed on the screen locked interface when the display timing is met. The display timing may be in a state in which the user powers on the screen and the mobile terminal is locked. The display timing may also be a state in which the screen is powered on and the user is viewing other cards in the information card list on the screen locked interface. The information card list may be a video card list, a news card list, or the like.

In an example, it can be determined whether the user is currently viewing the card in the information card list, when the user is currently viewing the card in the information card list, the target video card may be inserted at the location of the next card to the currently viewed card. When the user is not currently viewing the card in the information card list, in response to determining that the user begins viewing the card in the information card list, the target video card may be inserted at the location of the second card in the information card list. In the embodiment, the information card list can be displayed on the screen locked interface, in other words, the mobile terminal may have a viewing function when the screen is locked, i.e., in the screen locked state, the content in the video card can also be viewed.

Alternatively, in an embodiment of the present disclosure, the method further includes: in response to determining that the user is viewing the card in the information card list and is reviewing a viewed card, inserting the target video card at a location of a second card of unviewed cards when the user views the unviewed cards next time.

In other words, when it is detected that the user is currently viewing the card in the information card list, the target video card may be inserted at the location of the next card to the currently viewed card, when it is detected that is not currently viewing the card in the information card list, the target video card may be inserting at the location of the second card in the information card list in response to determining that the user begins viewing the card in the information card list, and when it is detected that the user is viewing the card in the information card list and is reviewing the viewed card, the target video card may be inserted at the location of the second card of unviewed cards when the user views the unviewed cards next time.

It can be understood that, the card in the information card list can be switched by sliding to left or right. For example, by sliding to the left, the information card list can be entered or a next card can be switched to, i.e., the unviewed card is switched to; by sliding to the right, a previous card can be switched to, i.e., the viewed card is reviewed.

With the method for displaying video information according to embodiments of the present disclosure, when the mobile terminal is in the screen locked state, the subscribed video message in the notification bar of the mobile terminal is parsed to acquire content information of the subscribed video message, the content information is integrated in the card display mode to generate the target video card, and finally the target video card is displayed on the screen locked interface of the mobile terminal. That is, by directly capturing the subscribed video in the notification bar, the content of the subscribed video is displayed on the screen locked interface in the card display mode, such that the users can view the content of their subscribed videos on the screen locked interface without unlocking the mobile terminal, which simplifies operation steps of viewing the content of the subscribed videos in the notification bar, and brings the users a convenient and quick use experience.

Figure 3:
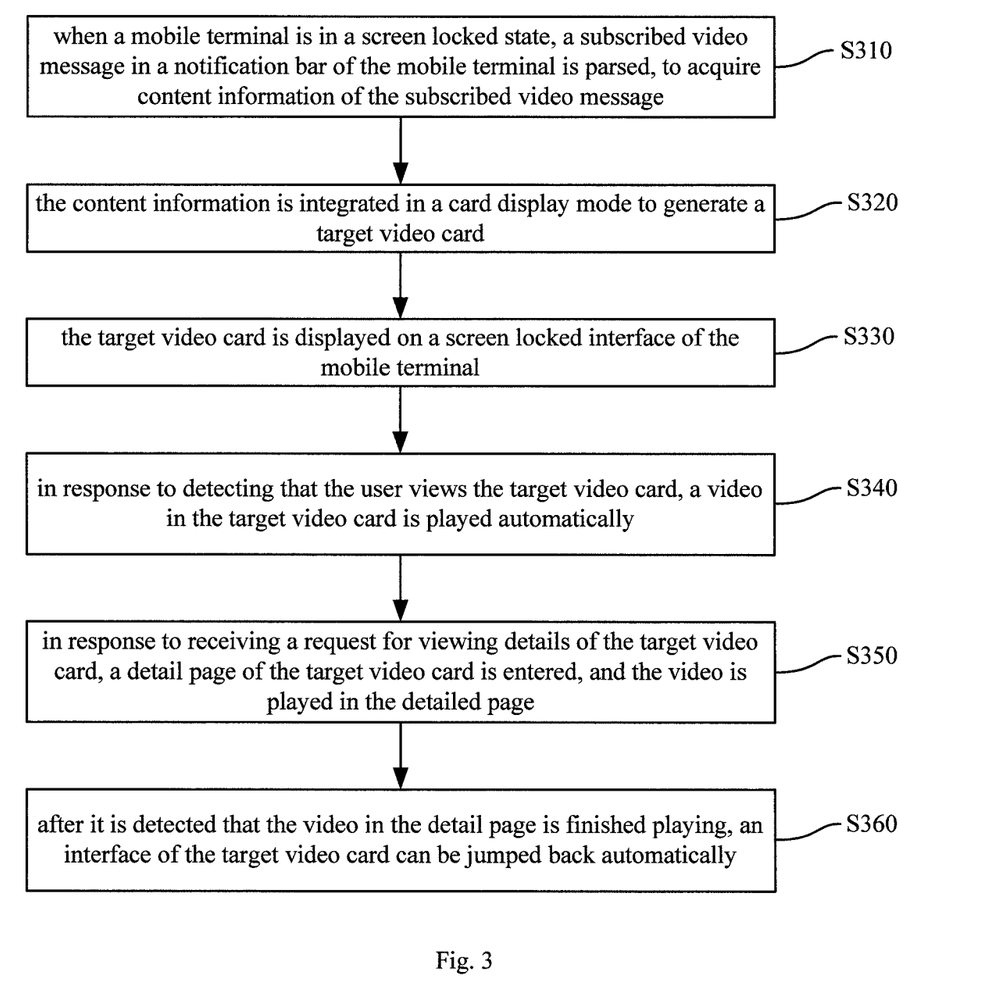
FIG. 3 is a flow chart of a method for displaying video information according to a specific embodiment of the present disclosure.

FIG. 3 is a flow chart of a method for displaying video information according to a specific embodiment of the present disclosure.

In order to further enhance the user experience and facilitate the user's use, in an embodiment of the present disclosure, when it is detected that the user views the target video card, the video in the target video card may be automatically played, and the video in the target video card may also be loaded into a detail page for displaying, or other operations (such as pause, fast forward, etc.). Specifically, as shown in FIG. 3, the method for displaying video information may include the followings.

At block S310, when a mobile terminal is in a screen locked state, a subscribed video message in a notification bar of the mobile terminal is parsed, to acquire content information of the subscribed video message.

In an example, when the mobile terminal is in the screen locked state, when it is detected that there is the subscribed video message in the notification bar, the subscribed video message can be parsed to acquire the title and video address information of the subscribed video message, the video description information of the subscribed video message can be acquired based on the video address information, and the video thumbnail of the subscribed video message can be generated based on the video address information.

At block S320, the content information is integrated in a card display mode to generate a target video card.

At block S330, the target video card is displayed on a screen locked interface of the mobile terminal.

In an example, it can be determined whether the user is currently viewing the card in the information card list, when the user is currently viewing the card in the information card list, the target video card may be inserted at the location of the next card to the currently viewed card. When the user is not currently viewing the card in the information card list, in response to determining that the user begins viewing the card in the information card list, the target video card may be inserted at the location of the second card in the information card list. In the embodiment, the information card list can be displayed on the screen locked interface, in other words, the mobile terminal may have a viewing function when the screen is locked, i.e., in the screen locked state, the content in the video card can also be viewed.

Alternatively, in an embodiment of the present disclosure, the method further includes: in response to determining that the user is viewing the card in the information card list and is reviewing a viewed card, inserting the target video card at a location of a second card of unviewed cards when the user views the unviewed cards next time.

At block S340, in response to detecting that the user views the target video card, a video in the target video card is played automatically.

Specifically, after the target video card is displayed on the screen locked interface, it can be detected whether the user views the target video card, when it is detected that the user views the target video card, the video in the target video card can be automatically played. In an example, the video can be played in a loop in the target video card.

At block S350, in response to receiving a request for viewing details of the target video card, a detail page of the target video card is entered, and the video is played in the detailed page.

Figure 2B:
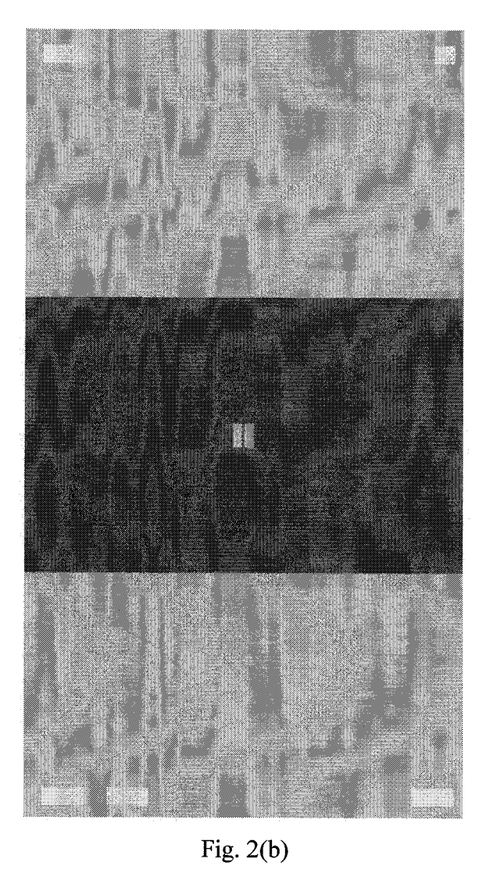

For example, the target video card may have a function entry for viewing the detail page, and the user can click the function entry to enter the detail page of the target video card. When the request for viewing details of the target video card is received, the detail page of the target video card can be entered, and the video can be played in the detailed page. For example, as shown in FIG. 2(b), the detail page only includes the subscribed video in the target video card, and functions such as pause, fast forward, fast reverse can be supported, by clicking the return key in the detail page, the page of the target video card can be returned.

At block S306, after it is detected that the video in the detail page is finished playing, an interface of the target video card can be jumped back automatically.

With the method for displaying video information according to embodiments of the present disclosure, after the target video card is displayed on the screen locked interface of the mobile terminal, it is detected whether the user views the target video card, when it is detected that the user views the target video card, the video in the target video card can be played automatically. Moreover, when the request for viewing details of the target video card is received, the detail page of the target video card can be entered, and the video can be played in the detailed page, thereby providing the user with a more convenient and quick use function, further improving the user experience.

Figure 4:
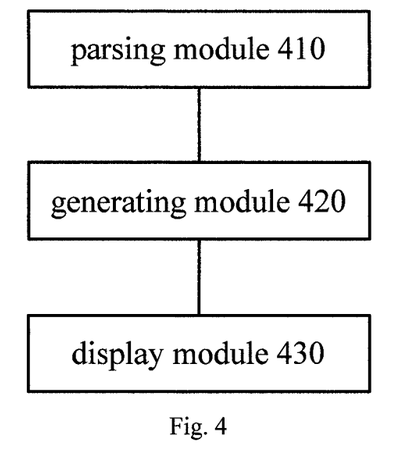
FIG. 4 is a block diagram of a device for displaying video information according to an embodiment of the present disclosure.

Corresponding to the method for displaying video information provided by the foregoing embodiments, embodiments of the present disclosure further provide a device for displaying video information. Since the device for displaying video information provided by the embodiment of the present disclosure corresponds to the method for displaying video information provided by the foregoing embodiments, the implementation manner of the method is also applicable to the device provided by the embodiment, and details are not described in this embodiment. FIG. 4 is a schematic diagram of a device for displaying video information according to an embodiment of the present disclosure. As illustrated in FIG. 4, the device may include a parsing module 410, a generating module 420 and a display module 430.

Figure 5:
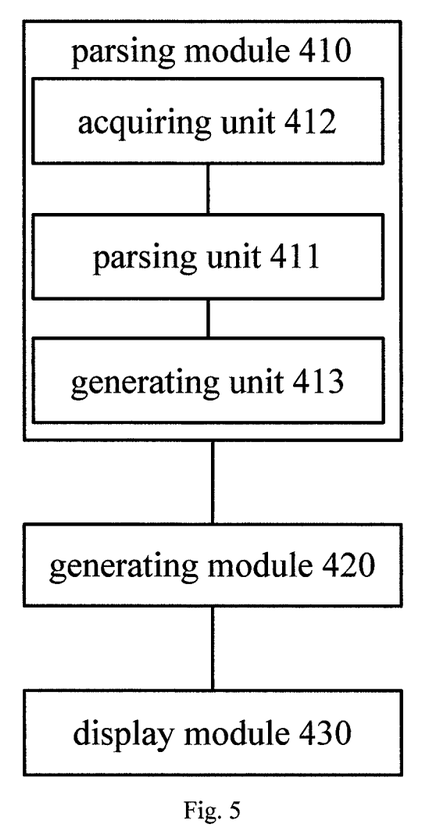
FIG. 5 is a block diagram of a device for displaying video information according to a specific embodiment of the present disclosure.

The parsing module 410 is configured to parse a subscribed video message in a notification bar of the mobile terminal to acquire content information of the subscribed video message, when a mobile terminal is in a screen locked state. In an example, the content information may include a title, a video thumbnail, and video description information. In the embodiment, as illustrated in FIG. 5, the parsing module 410 includes a parsing unit 411, an acquiring unit 412 and a generating unit 413.

The parsing unit 411 is configured to parse the subscribed video message to acquire the title and video address information of the subscribed video message. The acquiring unit 412 is configured to acquire the video description information of the subscribed video message based on the video address information. The generating unit 413 is configured to generate the video thumbnail of the subscribed video message based on the video address information.

The generating module 420 is configured to integrate the content information in a card display mode to generate a target video card.

Figure 6:
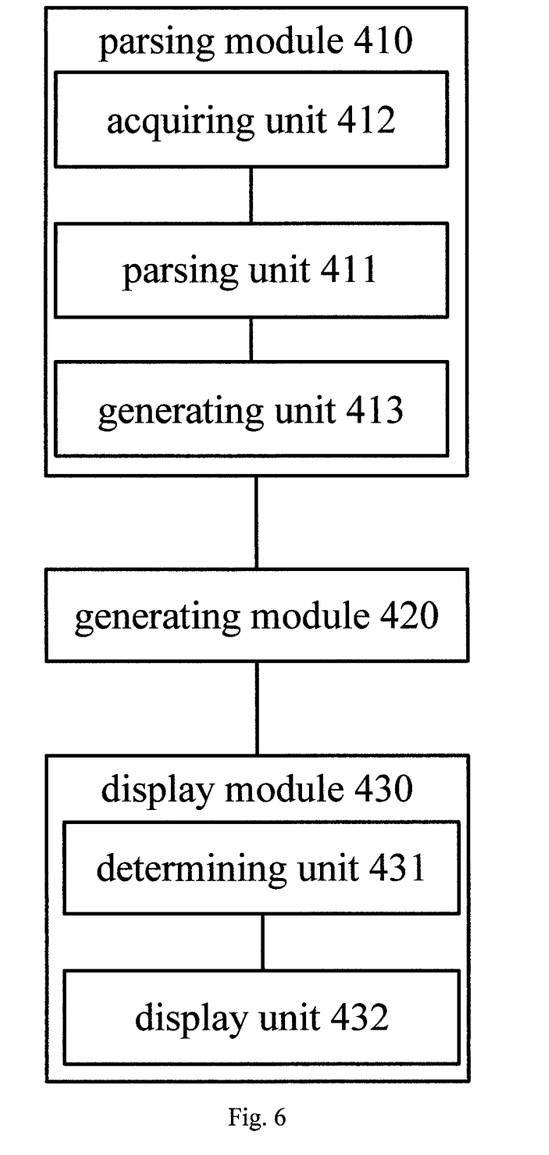
FIG. 6 is a block diagram of a device for displaying video information according to another embodiment of the present disclosure.

The display module 430 is configured to display the target video card on a screen locked interface of the mobile terminal. Specifically, in an embodiment of the present disclosure, as illustrated in FIG. 6, the display module 430 includes a determining unit 431 and a display unit 432. The determining unit 431 is configured to determine whether a user is currently viewing a card in an information card list. The display unit 432 is configured to, when the user is currently viewing the card in the information card list, insert the target video card at a location of a next card to a currently viewed card. In the embodiment, the display unit 432 is further configured to, when the user is not currently viewing the card in the information card list, insert the target video card at a location of a second card in the information card list in response to determining that the user begins viewing the card in the information card list.

Alternatively, in an embodiment of the present disclosure, the display unit 432 is configured to, in response to determining that the user is viewing the card in the information card list and is reviewing a viewed card, insert the target video card at a location of a second card of unviewed cards when the user views the unviewed cards next time.

Figure 7:
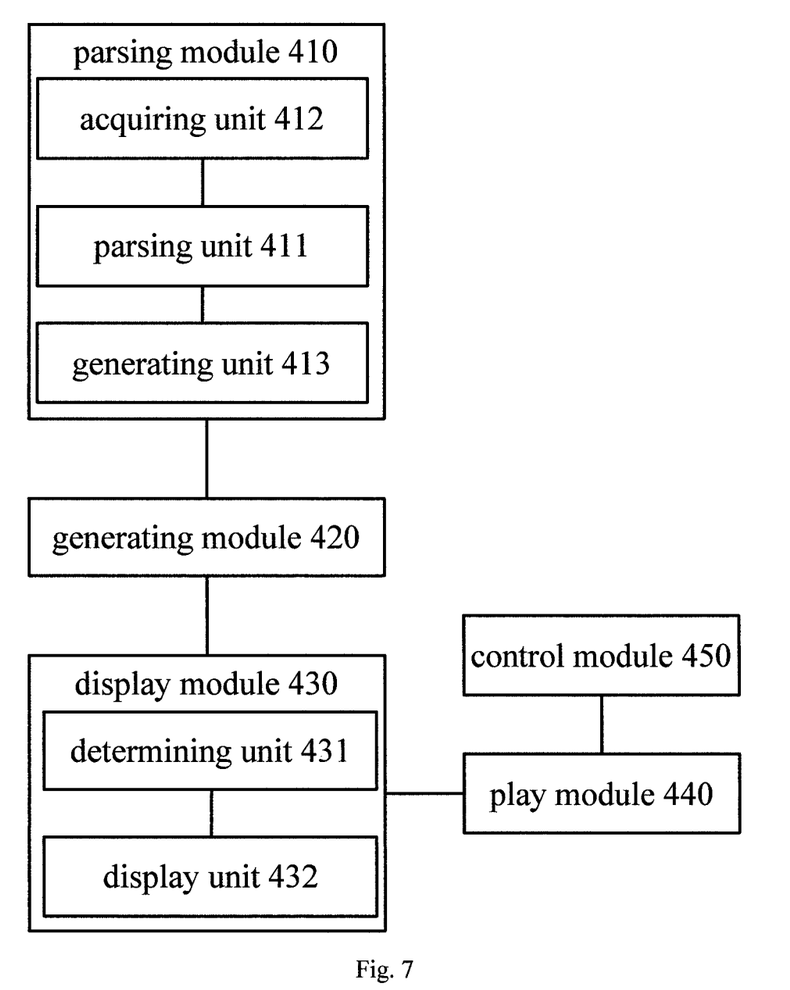
FIG. 7 is a block diagram of a device for displaying video information according to yet another embodiment of the present disclosure.

In order to further enhance the user experience and facilitate the user's use, furthermore, in an embodiment of the present disclosure, as illustrated in FIG. 7, the device further includes a play module 440 and a control module 450. The play module 440 is configured to play a video in the target video card automatically in response to detecting that the user views the target video card, after the display module 430 displays the target video card on the screen locked interface of the mobile terminal. The control module is configured to, in response to receiving a request for viewing details of the target video card, enter a detail page of the target video card, and play the video in the detailed page.

Figure 8:
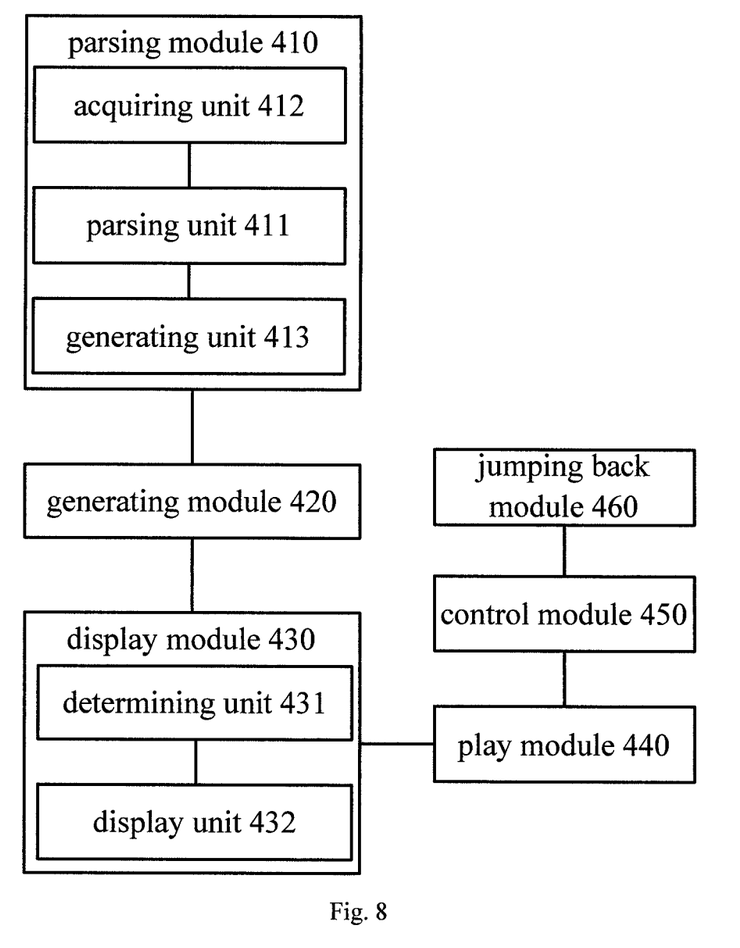
FIG. 8 is a block diagram of a device for displaying video information according to still another embodiment of the present disclosure.

In order to further enhance the user experience and facilitate the user's use, furthermore, in an embodiment of the present disclosure, as illustrated in FIG. 8, on the basis of FIG. 7, the device further includes a jumping back module 460. The jumping back module 460 is configured to jump back to an interface of the target video card automatically after finishing playing the video in the detail page.

With the device for displaying video information according to embodiments of the present disclosure, when the mobile terminal is in the screen locked state, the parsing module parses the subscribed video message in the notification bar of the mobile terminal to acquire content information of the subscribed video message, the generating module integrates the content information in the card display mode to generate the target video card, the display module displays the target video card on the screen locked interface of the mobile terminal. That is, by directly capturing the subscribed video in the notification bar, the content of the subscribed video is displayed on the screen locked interface in the card display mode, such that the users can view the content of their subscribed videos on the screen locked interface without unlocking the mobile terminal, which simplifies operation steps of viewing the content of the subscribed videos in the notification bar, and brings the users a convenient and quick use experience.

In order to implement the above embodiments, the present disclosure provides mobile terminal.

Figure 9:
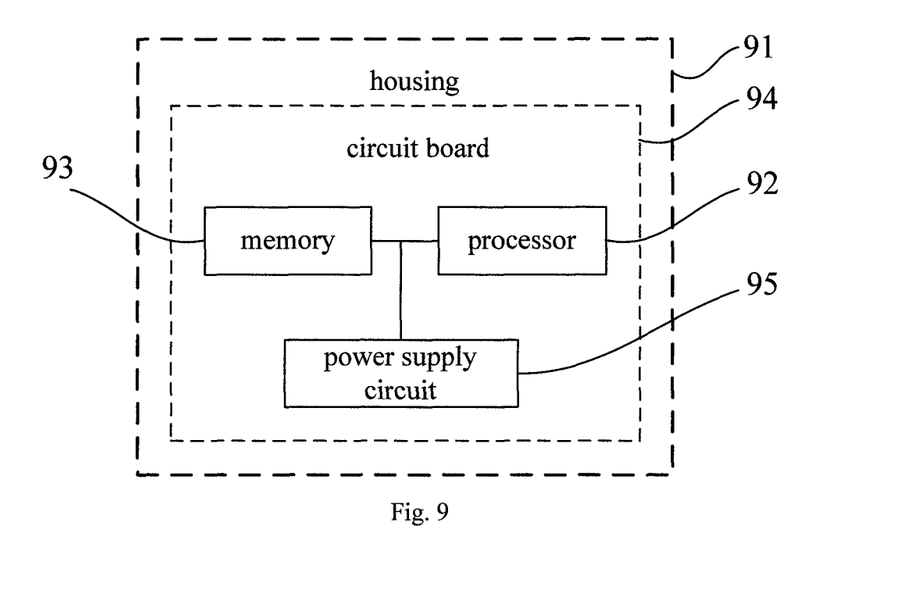
FIG. 9 is a block diagram of a mobile terminal according to an embodiment of the present disclosure.

FIG. 9 is a block diagram of a mobile terminal according to an embodiment of the present disclosure. As illustrated in FIG. 9, the mobile terminal may include a housing 91, a processor 92, a memory 93, a circuit board 94 and a power supply circuit 95. The circuit board 94 is arranged in a space enclosed by the housing 91. The processor 92 and memory 93 are arranged on the circuit board 94. The power supply circuit 95 is configured to provide power for respective circuits or components of the mobile terminal. The memory 93 is configured to store executable program codes. The processor 92 is configured to run a program corresponding to the executable program codes by reading the executable program codes stored in the memory 93, to perform following operations.

At block S910', when a mobile terminal is in a screen locked state, a subscribed video message in a notification bar of the mobile terminal is parsed, to acquire content information of the subscribed video message.

At block S920', the content information is integrated in a card display mode to generate a target video card.

At block S930', the target video card is displayed on a screen locked interface of the mobile terminal.

In order to implement the above embodiments, the present disclosure provides a storage medium. The storage medium is configured to store an application program. The application program is configured to perform the method for displaying video information according to the present disclosure when executed.

In order to implement the above embodiments, the present disclosure provides an application program. The application program is configured to perform the method for displaying video information according to the present disclosure when executed.

It should be illustrated that, in descriptions of the present disclosure, terms such as "first" and "second" are used herein for purposes of description and are not construed as indicating or implying relative importance or significance. Thus, the feature defined with "first" and "second" may include one or more this feature. In the descriptions of the present disclosure, unless it is specified otherwise, "a plurality of" means two or more than two, such as two, three, etc.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Any procedure or method described in the flow charts or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that, each part of the present disclosure may be realized by the hardware, software, firmware or their combination. In the above implementations, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be included.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for displaying video information, comprising:
    when a mobile terminal is in a screen locked state, parsing a subscribed video message in a notification bar of the mobile terminal, to acquire content information of the subscribed video message;
    integrating, in a card display mode, the content information to generate a target video card; and
    displaying the target video card on a screen locked interface of the mobile terminal.

2. The method according to claim 1, wherein the content information comprises a title, a video thumbnail, and video description information.

3. The method according to claim 2, wherein parsing the subscribed video message in the notification bar of the mobile terminal to acquire the content information of the subscribed video message comprises:
    parsing the subscribed video message to acquire the title and video address information of the subscribed video message;
    acquiring the video description information of the subscribed video message based on the video address information; and
    generating the video thumbnail of the subscribed video message based on the video address information.

4. The method according to claim 1, wherein displaying the target video card on the screen locked interface of the mobile terminal comprises:
    determining whether a user is currently viewing a card in an information card list;
    when the user is currently viewing the card in the information card list, inserting the target video card at a location of a next card to a currently viewed card; and
    when the user is not currently viewing the card in the information card list, inserting the target video card at a location of a second card in the information card list in response to determining that the user begins viewing the card in the information card list.

5. The method according to claim 4, further comprising:
    in response to determining that the user is viewing the card in the information card list and is reviewing a viewed card, inserting the target video card at a location of a second card of unviewed cards when the user views the unviewed cards next time.

6. The method according to claim 1, wherein after displaying the target video card on the screen locked interface of the mobile terminal, the method further comprises:
    in response to detecting that the user views the target video card, playing a video in the target video card automatically; and
    in response to receiving a request for viewing details of the target video card, entering a detail page of the target video card, and playing the video in the detailed page.

7. The method according to claim 6, further comprising:
    jumping back to an interface of the target video card automatically after finishing playing the video in the detail page.

8. A mobile terminal, comprising:
    a processor; and
    a memory, configured to store executable program codes;
    wherein the processor is configured to run a program corresponding to the executable program codes by the reading the executable program codes stored in the memory, to:
    when a mobile terminal is in a screen locked state, parse a subscribed video message in a notification bar of the mobile terminal, to acquire content information of the subscribed video message;
    integrate, in a card display mode, the content information to generate a target video card; and
    display the target video card on a screen locked interface of the mobile terminal.

9. The mobile terminal according to claim 8, wherein the content information comprises a title, a video thumbnail, and video description information.

10. The mobile terminal according to claim 9, wherein the processor is configured to:
    parse the subscribed video message to acquire the title and video address information of the subscribed video message;
    acquire the video description information of the subscribed video message based on the video address information; and generate the video thumbnail of the subscribed video message based on the video address information.

11. The mobile terminal according to claim 8, wherein the processor is configured to:
  determine whether a user is currently viewing a card in an information card list;
  when the user is currently viewing the card in the information card list, insert the target video card at a location of a next card to a currently viewed card;
  when the user is not currently viewing the card in the information card list, insert the target video card at a location of a second card in the information card list in response to determining that the user begins viewing the card in the information card list.

12. The mobile terminal according to claim 11, wherein the processor is configured to:
  in response to determining that the user is viewing the card in the information card list and is reviewing a viewed card, insert the target video card at a location of a second card of unviewed cards when the user views the unviewed cards next time.

13. The mobile terminal according to claim 8, wherein the processor is further configured to:
  play a video in the target video card automatically in response to detecting that the user views the target video card; and
  in response to receiving a request for viewing details of the target video card, enter a detail page of the target video card, and play the video in the detailed page.

14. The mobile terminal according to claim 13, wherein the processor is further configured to:
  jump back to an interface of the target video card automatically after finishing playing the video in the detail page.

15. A storage medium configured to store an application program that, when executed, performs a method for displaying video information, wherein the method comprises:
  when a mobile terminal is in a screen locked state, parsing a subscribed video message in a notification bar of the mobile terminal, to acquire content information of the subscribed video message;
  integrating, in a card display mode, the content information to generate a target video card; and
  displaying the target video card on a screen locked interface of the mobile terminal.

16. The storage medium according to claim 15, wherein the content information comprises a title, a video thumbnail, and video description information.

17. The storage medium according to claim 16, wherein parsing the subscribed video message in the notification bar of the mobile terminal to acquire the content information of the subscribed video message comprises:
  parsing the subscribed video message to acquire the title and video address information of the subscribed video message;
  acquiring the video description information of the subscribed video message based on the video address information; and
  generating the video thumbnail of the subscribed video message based on the video address information.

18. The storage medium according to claim 15, wherein displaying the target video card on the screen locked interface of the mobile terminal comprises:
  determining whether a user is currently viewing a card in an information card list;
  when the user is currently viewing the card in the information card list, inserting the target video card at a location of a next card to a currently viewed card; and
  when the user is not currently viewing the card in the information card list, inserting the target video card at a location of a second card in the information card list in response to determining that the user begins viewing the card in the information card list.

19. The storage medium according to claim 18, wherein the method further comprises:
  in response to determining that the user is viewing the card in the information card list and is reviewing a viewed card, inserting the target video card at a location of a second card of unviewed cards when the user views the unviewed cards next time.

20. The storage medium according to claim 15, wherein after displaying the target video card on the screen locked interface of the mobile terminal, the method further comprises:
  in response to detecting that the user views the target video card, playing a video in the target video card automatically;
  in response to receiving a request for viewing details of the target video card, entering a detail page of the target video card, and playing the video in the detailed page; and
  jumping back to an interface of the target video card automatically after finishing playing the video in the detail page.

* * * * *